Figure 5:
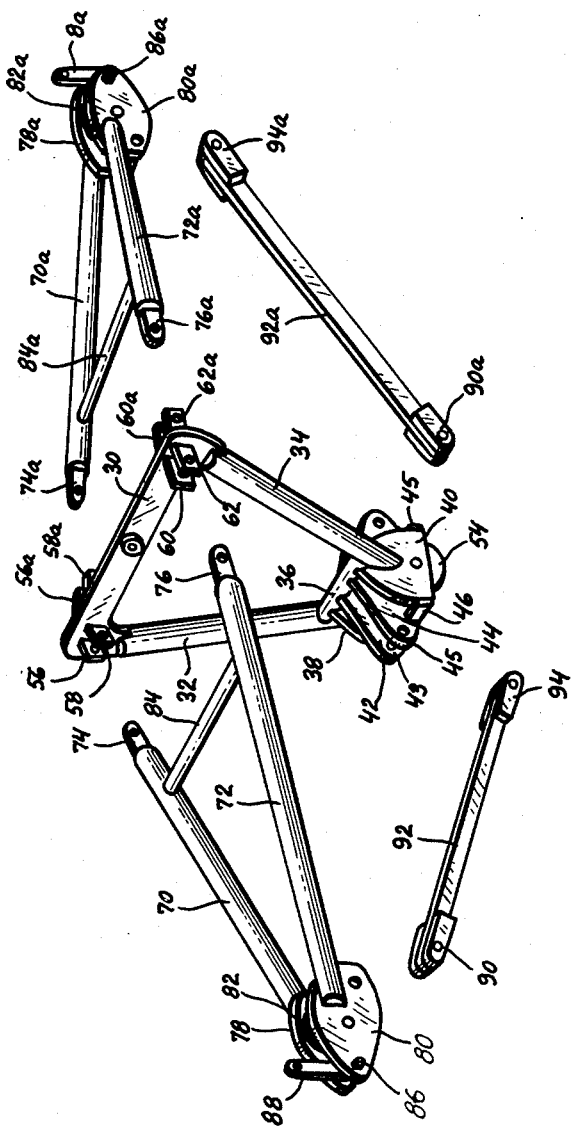

June 21, 1960 T. BILLE 2,941,674
CARGO HOISTING ARRANGEMENTS
Filed March 4, 1957 4 Sheets-Sheet 1
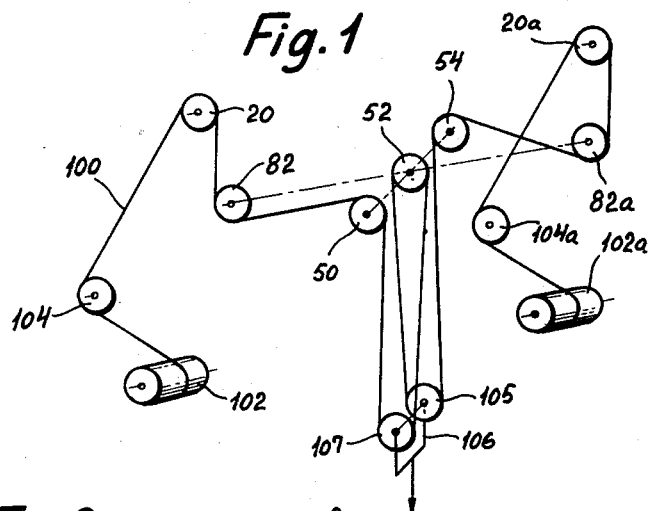
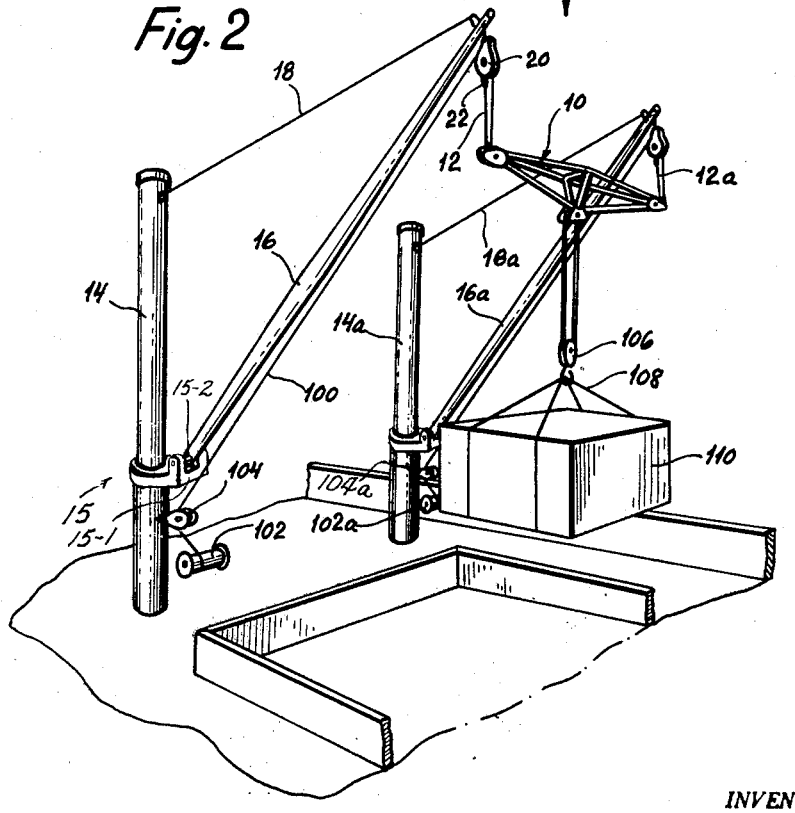
INVENTOR:
Torben Bille,
BY
His Agent

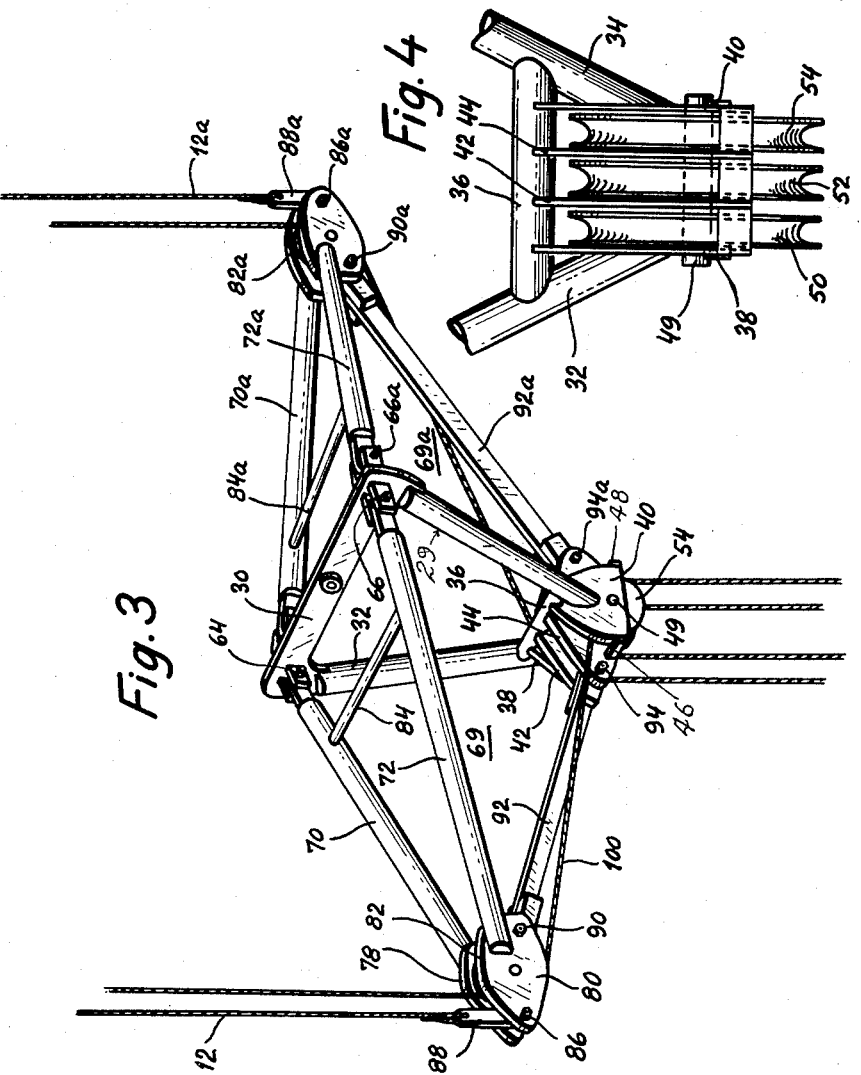

June 21, 1960

T. BILLE 2,941,674

CARGO HOISTING ARRANGEMENTS

Filed March 4, 1957

4 Sheets-Sheet 3

INVENTOR.
Torben Bille,
BY
[signature]
His Agent.

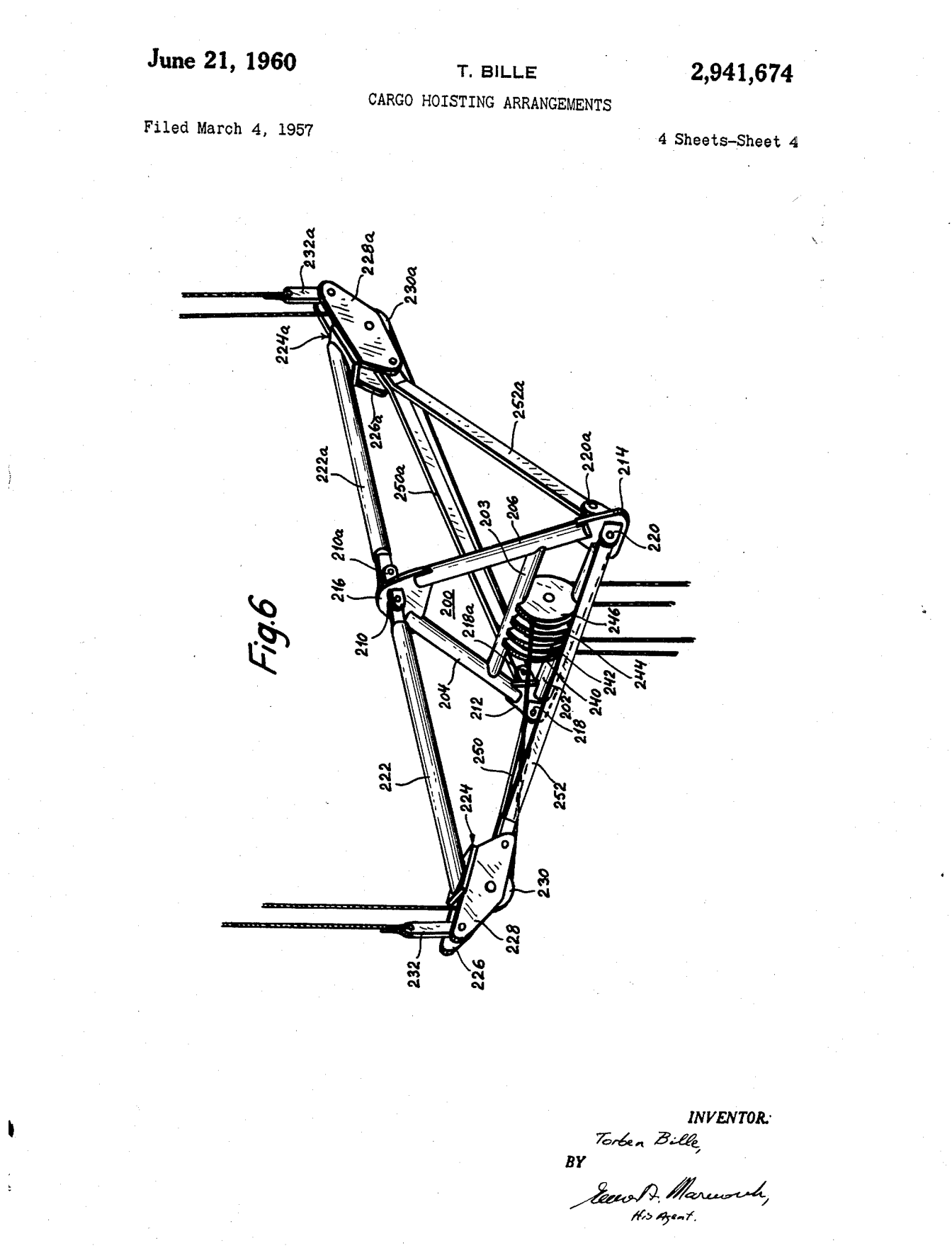

June 21, 1960

T. BILLE 2,941,674

CARGO HOISTING ARRANGEMENTS

Filed March 4, 1957

4 Sheets-Sheet 4

INVENTOR.
Torben Bille,
BY
His Agent.

2,941,674

United States Patent Office

Patented June 21, 1960

2,941,674
CARGO HOISTING ARRANGEMENTS

Torben Bille, Virum, Denmark, assignor to Aktieselskabet Nakskov Skibsvaerft, Nakskov, Denmark, a Danish company Filed Mar. 4, 1957, Ser. No. 643,636

Claims priority, application Denmark, Mar. 13, 1956

20 Claims. (Cl. 212—3)

The present invention relates to a cargo hoisting arrangement.

The arrangement according to the invention is especially but not exclusively designed for use on board a ship for lifting cargo from alongside the ship to within the hold or vice versa.

It is one object of the invention to provide a cargo hoisting arrangement to be used in connection with at least one crane or derrick which enables the handling of a load which is more heavy than a load which can be handled by the derrick only.

It is another object of the invention to provide a cargo hoisting arrangement which includes a pair of cranes or derricks and which enables safe handling of a load, the total weight of which is substantially the sum of the lifting power of the two cranes or derricks.

It is another object of the invention to ensure such a distribution of the load between said cranes or derricks in accordance with the load for which each of them is dimensioned.

It is a further object of the invention to provide a cargo hoisting arrangement which includes a yoke or girder structure which is associated with at least one crane or derrick and which is designed to carry a load in such a manner that only a part of the load is carried by said crane or derrick.

A further object of the invention is to provide a cargo hoisting arrangement including a yoke or girder suspended from the peaks of a pair of booms of said cranes or derricks so as to distribute the load between said cranes or derricks in proportion to the load for which each of them is dimensioned.

Still a further object of the invention is to provide a cargo hoisting arrangement including a yoke or girder suspended from the boom peaks of said cranes or derricks so as to enable the yoke to follow the swinging movement of the boom ends of the cranes or derricks.

Still another object of the invention is to allow the cargo to be lifted and lowered by means of each of a selected one of a pair of winches belonging to said cranes or derricks or by both said winches.

Still a further object of the invention is to provide a cargo hoisting arrangement which includes a hoisting rope or derrick runner which is reeved continuously through a yoke or girder structure below which the cargo is hanging in parts of said rope or runner.

Still an object of the invention is to provide a yoke or girder structure of considerable rigidity and stiffness in comparison with its own weight.

Another object of the invention is to provide a cargo hoisting arrangement including a yoke or girder structure which may be readily dismounted for easy stowing when not in use.

The invention will now in the following be described in more detail with reference to the accompanying drawing, in which Figure 1 is a diagrammatic, perspective view illustrating the reeving of the derrick runner, Figure 2 a diagrammatic, perspective view of the cargo hoisting arrangement mounted on two derricks on the deck of a ship and partly showing the hatch-coaming and the bulwark, Figure 3 a perspective view of the yoke or girder, Figure 4 an end view of the lower part of the yoke including the lifting gear, Figure 5 an exploded view of the yoke or girder, and Figure 6 a perspective view of the yoke or girder according to a modification of the invention.

As will be seen from the drawing, more specifically the diagram of Figure 1 in combination with Figure 2, the cargo hoisting arrangement according to the invention comprises a yoke or girder which is in general designated by 10 and which by appropriate means, for example wire straps 12 and 12a is suspended from the peaks of two derricks at its extremities.

In the embodiment shown in the drawing each of the derricks is composed of a Samson post 14 carrying a boom 16 which at its lower end is swingingly supported on the Samson post in any suitable known manner, such as by a swivel joint 15 and held in inclined position by a pendant 18. The bracket 15–1 of the swivel joint 15 is free to rotate on the post 14, and a pivot pin 15–2 connects the boom 16 to the bracket 15–1, all as shown in Figure 2. A block 20 is fitted to the peak of the boom and provided with a becket 22 to which the two straps 12 and 12a are fitted for example by a shackle.

In the embodiment shown in the drawing, see Figures 3 and 4, the yoke comprises a central polygonal, preferably triangular frame, generally referred to by 29, with its apex pointing downward and comprising an upper, substantially horizontal steel bar 30 to the ends of which two struts 32 and 34 of steel tube are secured for example by welding. The struts 32 and 34 are converging towards the apex and form the two other sides of the triangle. Adjacent the lower ends, the struts 32, 34 are connected by a horizontal steel tube 36 secured to the struts for example by welding. To the lower ends of the struts 32, 34 two vertical steel plates 38 and 40 are welded in spaced relationship. Between the plates 38 and 40 two further vertical steel plates 42 and 44 are arranged in spaced relationship from each other as well as from the plates 38 and 40. All the plates 38, 42, 44, 40 are at their upper ends secured to the tube 36, for example by welding.

At the lower ends of the plates 38 and 40, see Figures 3 and 4, distance pieces 46 and 48 are, for example by welding, secured to the opposite side edges of the plates. These distance pieces are also secured to the plates 42 or 44 in such a manner that three compartments are provided for three sheaves 50, 52, 54 which are rotatably mounted on a common bolt or shaft 49 between the plates 38, 42, 44 and 40.

The bolt 49 passes through holes in the said four plates which together with the sheaves form the stationary part of a lifting gear structure, or tackle which includes a lifting block hanging in parts of a hoisting rope below the above described sheave structure.

The upper horizontal bar 30 has adjacent each end pairs of flaps extending in opposite directions. Each pair of flaps is provided with holes for inserting bolts of which three, 64, 64a, and 66 are shown in Figure 3.

The yoke or girder structure further comprises two other pairs of pyramidal structures or jibs, generally referred to by 69 and 69a, each of which at its bottom or base is secured to said vertical pyramidal structure and converges towards its apexes.

The apexes of these structures are by means of cantilever rods extending in inclined position connected with the corners of said vertical triangular structure 29.

In more specific terms said bolts are connecting two pairs of struts 70, 72 and 70a, 72a respectively, with each side of the top of the triangular frame. The two pairs of struts 70, 72 and 70a, 72a can be steel tubes which at their inner ends are provided with flaps 74, 76 and 74a, 76a in such spaced relationship that they can be put in between the pairs of flaps extending at each side from the bar 30 to secure the struts to the triangular frame 20.

At their exterior ends towards which the pairs of struts 70, 72 and 70a, 72a are converging, they are secured to two pairs of vertical steel plates 78, 80 and 78a, 80a forming the extremities of the yoke and arranged in spaced relationship so as to form a space for two sheaves 82 and 82a, which by means of a shaft or bolt are rotatably mounted between the pairs of steel plates 78, 80 and 78a, 80a. Adjacent their inner ends the struts 70, 72 and 70a, 72a respectively, are connected by steel tubes 84 and 84a which are welded to the struts.

At their exterior ends the pairs of steel plates 78, 80 and 78a, 80a respectively, are provided with holes for inserting bolts 86 and 86a to connect the steel plates 78 and 80 as well as 78a and 80a and to secure two becket members 88 and 88a respectively between the said steel plates and form carrying members for the hoist structure.

The pairs of steel plates 78, 80 and 78a, 80a respectively are furthermore at their lower inner ends provided with holes for inserting bolts 90 and 90a for securing two tension bars 92 and 92a to the exterior ends of the steel plates. The bars 92 and 92a are at their inner ends by means of bolts 94 and 94a detachably secured to opposite and outwardly directed pairs of projections on the steel plates 42 and 44 of which one pair 43, 45 only is shown.

Thus it will be seen that the yoke 10 comprises a central polygonal structure member which at each side has a pyramidal cantilever structure formed by the pair of struts 70, 72 and the tension bar 92 and the pair of struts 70a, 72a and the tension bar 92, 92a respectively. This whole structure forms a framework which may be of a light weight, but still of a high rigidity. Furthermore it will be seen that this framework may be easily dismounted into parts of small bulk which may be easily stowed when not in use.

When applying the equipment above described in cargo handling, the yoke 10 as mentioned suspended by means of the wire straps 12, 12a from the peaks of two cranes or derricks. A continuous derrick runner or hoisting rope 100 is reeved from a winch 102 of the first derrick through a guide block 104, the block 20 at the peak of the derrick, and over the sheave 82 at one end of the yoke.

From the sheave 82 the runner passes over one of the sheaves at the apex of the triangular member of the yoke, for example the sheaves 50. From the sheave 50 the runner passes to the first sheave in a double sheave lifting block 106 which is provided with a cargo hook 108 for suspending the cargo 110. From the said sheave of the lifting block 106 the runner passes to the next sheave 52 of the lifting gear and further over the second sheave of the lifting block 106 to the sheave 54 over the sheave 82a at the other end of the yoke and from here to the block 20a at the peak of the second derrick, and from which the rope passes down over the guide block 104a to the winch 102a of said second derrick.

As it will be appreciated from the foregoing specification the hoisting gear includes at least one sheave in the cargo hoisting block hanging in the parts below the yoke or girder and at least two sheaves associated with the yoke. In other words, the part of the hoisting gear associated with the yoke must always have one sheave more than the cargo lifting block which includes the hook.

It will be appreciated that the yoke may be of any other suitable construction within the scope of the claims. Thus for instance, the embodiment above described may be modified by having a triangular central section with its apex pointing upward.

In the embodiments above described the lifting gear is arranged at the middle of the yoke so that the load will be distributed between the two derricks with half of its weight to each. It will be understood, however, that the present arrangement may also be applied to derricks or cranes with different capacities by placing the lifting gear nearer to one end of the yoke than to the other in such a way that the load is distributed to each of the derricks proportional with its lifting capacity.

It will be further be seen that by the arrangement according to the invention the winches of the two derricks need not necessarily operate in exact synchronism, and it will even be possible to operate the hoisting gear with one winch only.

It will furthermore be appreciated that in order to provide for maximum swinging of the booms from within the hold to alongside the ship, the yoke should be of such a length that when swung in its horizontal plane, the booms are retained in substantially parallel relationship.

Though the invention in the foregoing is described in connection with two cranes or derricks, it will also be appreciated that the yoke or girder may be used in connection with one crane or derrick only, though this will somewhat limit its operating radius. In such event one of the derricks is omitted and the end of the yoke can be suspended at a stationary point about which the yoke is able to swing, when its other end swings with the boom.

According to the modification of Figure 6 a pair of outwardly extending members, each forming a triangular structure is secured to the corner plates 210, 212, and 214. Each of these pyramidal structures has an upper rod 222 and 222a respectively, for example in the form of a tube. To the exterior ends of these rods plate structures 224 and 224a respectively are welded. Each of these plate structures has parallel side walls 226, 228 and 226a, 228a respectively between which the exterior sheaves 230 and 230a are rotatably supported.

In the same manner as in the foregoing example, elongated distance pieces 232 and 232a are arranged between the side walls of the plate structures so as to enable the yoke of girder to be suspended as previously described.

From the lower corner plates 212 and 214 outwardly and upwardly converging pairs of tension bars 250, 252 and 250a, 252a are extending and terminating at each end in the space between the side wall pairs 226, 228 and 226a, 228a so as to form another pair of distance pieces.

In the middle portion a cross bar 203, for example in the form of a tubular member is extending substantially parallel with the lower bar 202, and between the lower bar 202 and the cross bar 203 a plurality of plate members 240, 242, 244, and 246 are secured, for example by welding to provide compartments for a plurality of sheaves rotatably arranged in the same manner as the sheaves in the foregoing example.

The hoisting rope is in this embodiment passed over the various sheaves in the same manner as previously described.

It will be appreciated that the invention comprises a cargo hoisting arrangement as well as a hoisting structure including a yoke or girder structure which per se forms an article of manufacture.

Though in the foregoing the invention has been described in great detail, it will be understood that the embodiments shown and described are examples only, and that various further modifications may be possible within the scope of the invention. Such for example it has been indicated in the foregoing that the various parts of the yoke or girder structure may be assembled by bolts. This serves the purpose of obtaining a demounting of the yoke, so that the same may readily be stowed away without occupying excessive space when not in use.

With reference to the embodiment shown in Figure 3 a suitable manner of demounting the yoke is illustrated in form of an exploded view of the yoke. The parts which have already been described will not be mentioned again here. In Figure 5, however, the oppositely extending pairs of flaps at the ends of the top bar 30 of the middle structure can be seen clearly and are referred to by 56, 58 and 56a, 58a at one end as well as 60, 62 and 60a, 62a at the other end. Furthermore Figure 5 shows flaps 74 and 76 extending at the ends of the rods 70 and 72 as well as corresponding flaps 74a, 76a extending at the ends of the rods 70a, 72a. These flaps may be in the form of pieces of flat iron which are welded to the ends of the tubular members. It will be understood from Figure 5 that the flap pairs 74, 76 and 74a, 76a are so arranged that when assembling the yoke or girder, they are fitting in between the flap pairs on the middle structure. It will be understood, however, that it will also be possible to have single flaps extending from the middle structure of the yoke and pairs of flaps at the ends of the bars of the outwardly extending portions.

As it also appears from Figure 5, the structure is so designed that the bolts 90 and 94 as well as 90a and 94a, see Figure 3, can be removed so as to separate the tension rods 92 and 92a from the remaining part of the structure.

I claim:

1. In a cargo hoisting arrangement for use onboard a ship to selectively lift and move a cargo from alongside the ship to within the hold and vice versa, the combination with a pair of derricks having substantially parallel booms of an elongated girder structure, means for suspending said girder structure in substantially horizontal position adjacent each end hanging below the peak of each of said derrick booms, said elongated girder structure having a sheave adjacent each end and between said sheaves a lifting gear comprising a plurality of sheaves, a pair of winches, a guide block at the lower end of said pairs of derricks, a guide block at the peak of each of said derricks, a continuous elongated hoisting rope extending between said winches and passing over each of said guide blocks at the lower ends of said derricks, each of said peak blocks, each of said sheaves at the end of said girder structure and passing over said plurality of sheaves arranged between said end sheaves of said girder structure with a plurality of parts, and a cargo block including cargo suspension means having a plurality of sheaves and hanging in said parts of said rope.

2. In a cargo hoisting arrangement, the combination of an elongated girder structure, means for suspending said structure in substantially horizontal position to be moved in a horizontal plane, said elongated structure having a pair of exterior sheaves and an intermediate lift gear comprising a plurality of sheaves, a pair of winches, a hoisting rope extending in a continuous path between each of said winches passing over each of said exterior sheaves of said elongated structure as well as over the sheaves of said intermediate lift gear, the portion of said rope between said lift gear sheaves having a plurality of parts and a cargo block including cargo suspension means having at least one sheave and hanging in said parts of said rope.

3. In a cargo hoisting arrangement for use onboard a ship: the combination of an elongated frame structure, means for suspending said frame structure in a substantially horizontal plane and designed to allow said frame structure to be moved in said plane, said structure having a pair of exterior sheaves in spaced relationship and a plurality of intermediate sheaves arranged in juxtaposed relationship substantially at the middle between said exterior sheaves, a hoisting rope passing over said plurality of juxtaposed sheaves forming a plurality of downwardly directed parts, a cargo block including cargo suspension means having at least one sheave and hanging in said parts of said rope, said hoisting rope passing continuously sidewardly from each of two of said juxtaposed sheaves over each of said exterior sheaves, guiding means for said rope beyond said sheaves and fastening means for the ends of said rope including means for varying the length of said rope between said fastening means.

4. In a cargo hoisting arrangement for use onboard a ship: the combination of an elongated cargo carrying member, means for suspending said member to be moved in a substantially horizontal plane, said elongated member having a pair of spaced sheaves supported thereon and a plurality of juxtaposed sheaves supported thereon between said spaced sheaves, a continuous hoisting rope extending from points remote from said cargo carrying member passing from each end over each of spaced sheaves over two different of said juxtaposed sheaves forming therebetween at least two substantially vertical parts, a cargo block including cargo suspension means hanging in said parts of said rope, and means remote from said cargo carrying member operable to vary the length of said rope parts.

5. In a cargo hoisting arrangement for use onboard a ship: the combination of an elongated cargo carrying member, a pair of swingingly arranged derricks, means for suspending said member in a substantially horizontal plane from the peak of each of said derricks, a block at the peak of each of said derricks, said elongated member having a sheave supported thereon adjacent each end and a plurality of juxtaposed sheaves supported thereon between said end sheaves, a continuous hoisting rope extending from points remote from said cargo carrying member passing from each end over each of said blocks at the peak of each of said derricks, further over each of said end sheaves to at least two different of said juxtaposed sheaves between which said rope forms substantially vertical parts, a cargo block including cargo suspension means having a plurality of sheaves and hanging in said parts of said rope, and means remote from said cargo carrying member operable for varying the length of said rope parts.

6. In a cargo hoisting arrangement for use onboard a ship to selectively lift and move a cargo from alongside the ship to within the hold and vice versa: the combination with a pair of derricks each having a boom of an elongated structure, means for suspending said structure in substantially horizontal position adjacent each end hanging below the peak of each of said booms, the length of said elongated structure being so designed relatively to the distance between said booms that they are guided substantially parallel when said elongated structure is swung in said horizontal plane, said elongated structure having a sheave adjacent each end and between said sheaves a lifting gear comprising a plurality of sheaves, a pair of winches, a guide block at the lower end of said pairs of derricks, a block at the peak of each of said derricks, a continuous elongated hoisting rope extending from each of said winches over each of said guide blocks, each of said peak blocks, each of said sheaves at the end of said elongated structures and passing over said plurality of sheaves arranged between said end sheaves of said elongated structure with a plurality of parts, and a cargo block including cargo suspension means having a plurality of sheaves and hanging in said parts of said rope.

7. In a cargo hoisting arrangement for use onboard a ship: the combination of an elongated cargo carrying member comprising a frame structure which is composed of a middle portion and two oppositely directed portions which at their interior ends are connected with said middle portion which is arranged in a plane substantially vertical to the longitudinal axis of said elongated member, means for suspending said member movable in a substantially horizontal plane, said elongated member having a pair of spaced sheaves supported thereon and a plurality of juxtaposed sheaves supported thereon between said spaced sheaves, a hoisting rope extending continuously from points remote from said cargo carrying member passing from each end over each of spaced sheaves over two of said juxtaposed sheaves having a plurality of parts therebetween of said juxtaposed sheaves, a cargo block including cargo suspension means having at least one sheave and hanging in said parts of said rope, and means remote from said cargo carrying member operable for varying the length of said rope parts between said juxtaposed sheaves and said cargo block.

8. A cargo hoisting arrangement as claimed in claim 7, in which each of said spaced sheaves is supported adjacent the exterior end of each of said oppositely directed portions of said frame structure, and in which said juxtaposed sheaves are supported on said middle portion of said frame structure.

9. A cargo hoisting arrangement as claimed in claim 8, including releasable connections between each of said oppositely directed portions of said frame structure and the middle portion thereof.

10. In a cargo hoisting arrangement for use onboard a ship: the combination of an elongated cargo carrying frame structure comprising a substantially plane polygonal middle frame portion and a pair of pyramidal frame structures connected at their base to each side of said middle frame structure, means for suspending said frame structure movable in a substantially horizontal plane, said frame structure having a sheave supported adjacent the apex of each of said pyramidal structures and a plurality of juxtaposed sheaves supported on said middle frame structure, a hoisting rope extending continuously from points remote from said cargo carrying structure passing from each end over each of spaced sheaves adjacent the apex of said pyramidal structures and over two of said juxtaposed sheaves having a plurality of parts therebetween of said juxtaposed sheaves, a cargo block including cargo suspension means having at least one sheave and hanging in said parts of said rope, and means remote from said cargo carrying member operable for varying the length of said rope parts between said juxtaposed sheaves and said cargo block.

11. A cargo hoisting arrangement as claimed in claim 10, in which each of said pyramidal structures adjacent its apex has a pair of spaced plates between which the sheave is supported and in which an elongated distance member is arranged with one end between each of said spaced plates extending outside the orbit thereof and designed for suspending said frame structure.

12. A cargo hoisting arrangement as claimed in claim 10, in which said polygonal middle frame portion has a transverse member substantially parallel with one of the sides of said frame structure and in which a plurality of spaced plates are secured between said transverse member and the frame member parallel therewith, said juxtaposed sheaves being arranged in axial alignment in each of the spaces between said plurality of plates.

13. As an article of manufacture: a girder structure for a cargo hoisting arrangement comprising a polygonal frame structure having a plurality of side frames and a plurality of corners, a transverse member extending between two opposite side frame members, a plurality of partitions secured to said transverse member in spaced relationship, a plurality of sheaves each being rotatably arranged between each pair of adjacent partitions, a pair of elongated pyramidal structures each having its base connected to said polygonal frame at each side thereof, each of said pyramidal structures having adjacent its exterior end a pair of plates with a sheave mounted for rotation between said pair of plates and an elongated distance member arranged between said plates extending outside the orbit thereof, the extending end of said distance member having means for suspending the end of said girder structure.

14. As an article of manufacture: a yoke structure for a cargo hoisting arrangement comprising a polygonal frame having a plurality of sides and a plurality of corners, a plurality of partitions secured to said frame in spaced relationship, a plurality of sheaves each arranged rotatably between each pair of adjacent partitions, a pair of elongated pyramidal structures each being connected at its base to said polygonal frame at each side thereof, each of said pyramidal structures having adjacent its exterior end a pair of plates and a sheave mounted for rotation between said pair of plates.

15. As an article of manufacture: a yoke structure for a cargo hoisting arrangement comprising a triangular frame having three side frames and three corners, a plurality of parallel partitions secured to said triangular frame substantially vertical to one of said side frames and in spaced relationship, a plurality of sheaves each being rotatably arranged between each pair of neighbor partitions, a pair of triangular pyramidal structures, each including three frame members, the ends of which at the base of each of said triangular structures are connected to said triangular frame adjacent each corner thereof, each of said pyramidal structures having adjacent its exterior end a pair of plates in planes substantially parallel with the planes of said plurality of partitions, and a sheave mounted for rotation between each of said pair of plates.

16. A yoke structure as claimed in claim 15, in which two frame members of said triangular frame are tubular members, a pair of said partitions having oppositely arranged directed extensions in which two frame members of each of said pyramidal structures are tubular members connected with each of said corners of said triangular frame remote from said corner at which said partitions are arranged and an elongated tension member secured between said pair of plates adjacent the exterior end of said pyramidal structure and said pair of extensions of said partitions.

17. A yoke structure as claimed in claim 15 in which said plurality of partitions are secured to one of said side frame members of said triangular structure, substantially vertical thereto and in which each of said pyramidal structures includes a tubular member connected to the corner of said triangular structure opposite the side member thereof to which said partitions are secured, and a pair of elongated tension members extending between the apex of said pyramidal structure at each of the corners of said triangular structure at the end of that frame bar to which said partitions are secured.

18. A yoke structure as claimed in claim 15, in which the connection between said triangular frame and each of said pyramidal structures includes connection members designed for disconnecting each of said pyramidal structures from said triangular structure.

19. As an article of manufacture to be used with a pair of derricks on board a ship: an elongated structure for carrying cargo when suspended below the peak of a pair of ship derricks comprising in combination: a triangular structure comprising a substantially flat bar and a pair of tubular bars converging from the ends of said flat bar towards the apex of said triangular structure a plurality of wall members arranged in spaced relationship between the ends of the tubular bars, a plurality of sheaves each mounted for rotation in the space between each pair of said walls, said flat bar having oppositely directed flaps adjacent each of its ends, a pair of triangular pyramidal structures, each comprising a pair of tubular members and a tension rod connected at its base with said tubular members to said flaps and with the ends of said tension bars to points adjacent the apex of said triangular structure, each of said pyramidal structures having at its apex a pair of spaced walls substantially parallel with said walls of said triangular structure, and a sheave rotatably arranged between each of said walls.

20. As an article of manufacture to be used with a pair of derricks on board a ship: an elongated structure for carrying cargo when suspended below the peak of a pair of ship derricks comprising in combination: a triangular bar structure, a plurality of wall members arranged in spaced relationship and secured to one of the bars of said triangular structure substantially perpendicular thereto, a plurality of sheaves mounted for rotation in the space between each pair of said walls, said triangular structure having extending from each corner oppositely directed fastening members, a pair of triangular pyramidal structures each having a tubular member and a pair of tension rods, said pyramidal structure being connected at its base to the fastening members extending at the corners of said triangular bar structure with said tubular member connected to the corner opposite said bar to which said wall members are secured and each of said tension bars being connected to each of the two other corners of said triangular structure, said triangular structure including at its apex a pair of spaced walls substantially parallel with said walls of said triangular structure, and a sheave rotatably arranged between each of said walls.

References Cited in the file of this patent

UNITED STATES PATENTS

| | | |
|---|---|---|
| 261,722 | Johnson | July 25, 1882 |
| 466,090 | Brown | Dec. 29, 1891 |
| 1,931,071 | Halstead | Oct. 17, 1933 |
| 2,354,182 | Christoffersen | July 25, 1944 |
| 2,382,767 | Zeilman | Aug. 14, 1945 |
| 2,564,966 | Farrell | Aug. 21, 1951 |
| 2,698,949 | Miller | Jan. 11, 1955 |

FOREIGN PATENTS

| | | |
|---|---|---|
| 936,754 | France | Feb. 23, 1948 |